United States Patent [19]

Krounbi et al.

[11] Patent Number: 4,785,366
[45] Date of Patent: Nov. 15, 1988

[54] MAGNETORESISTIVE READ TRANSDUCER HAVING PATTERNED ORIENTATION OF LONGITUDINAL BIAS

[75] Inventors: Mohamad T. Krounbi, San Jose; Otto Voegeli, Morgan Hill, both of Calif.

[73] Assignee: International Business Machine Corporation, Armonk, N.Y.

[21] Appl. No.: 71,491

[22] Filed: Jul. 9, 1987

[51] Int. Cl.⁴ .............................................. G11B 5/39
[52] U.S. Cl. .................................................... 360/113
[58] Field of Search ........................................ 360/113

[56] References Cited

U.S. PATENT DOCUMENTS

| | | | |
|---|---|---|---|
| 4,103,315 | 7/1978 | Hempstead et al. | 360/110 |
| 4,663,685 | 5/1987 | Tsang | 360/113 |
| 4,713,708 | 12/1987 | Krounbi et al. | 360/113 |

Primary Examiner—Robert S. Tupper
Attorney, Agent, or Firm—Otto Schmid, Jr.

[57] ABSTRACT

A magnetoresistive (MR) read transducer assembly in which the thin film MR layer is longitudinally biased only in the passive regions by exchange bias developed by a thin film of antiferromagnetic material that is deposited in direct contact with and continuously covering a thin film of soft magnetic material which extends across the transducer assembly. The longitudinal bias is developed by exchange coupling between the thin film of antiferromagnetic material and both the MR layer and the thin film of soft magnetic material in the passive regions. However, the thin film of soft magnetic material is separated from the MR layer in the active region only of the MR layer by a decoupling layer which interrupts the exchange coupling so that transverse bias is produced only in the active region upon connection of a bias source to conductor leads which are connected to the MR layer within the passive region. The transverse bias is produced in that part of the active region of the MR layer in which the bias/sense current and the decoupling layer are both present. Upon connection of a signal sensing means to the conductor leads, an output signal is sensed which detects resistance changes in the MR layer as a function of the fields which are intercepted by the MR layer.

18 Claims, 3 Drawing Sheets

MAGNETORESISTIVE READ TRANSDUCER HAVING PATTERNED ORIENTATION OF LONGITUDINAL BIAS

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

In the past, principal problems with the MR sensors of unstable operating characteristics and Barkhausen noise have limited their use. These problems arise because there generally exist more than one stable state for the magnetization, a degeneracy which typically produces various multi-domain configurations. Random changes in this configuration are the cause of the above-mentioned unstable operating characteristics and Barkhausen noise.

Commonly assigned U.S. Pat. No. 4,103,315 to Hempstead et al discloses the use of antiferromagnetic-ferromagnetic exchange coupling to produce a uniform longitudinal bias along the entire MR sensor for domain suppression. However, this structure provides response characteristics that are less sensitive than those required for some applications.

The conceptual solution to these prior art problems was attained only recently through the implementation of patterned longitudinal bias. This solution is described and claimed in the commonly assigned patent application entitled Magnetoresistive Read Transducer by Ching H. Tsang, Ser. No. 766,157, filed 8-15-85, now U.S. Pat. No. 4,663,685. Briefly, this invention advocates the creation of appropriate single domain states directly in the passive end regions only of the MR layer. This can be achieved by producing a longitudinal bias in the end regions only of the MR layer to maintain the end regions in a single domain state and these single domain states induce a single domain state in the central active region of the MR layer. A specific embodiment of this concept is described and claimed in commonly assigned patent application entitled Magnetoresistive Read Transducer by Krounbi et al, Ser. No. 926,076, filed 10-31-86, now U.S. Pat. No. 4,713,708. In this specific embodiment, a longitudinal bias is produced in the passive end regions only of the MR sensor to maintain the passive end regions in a single domain state, and a thin film of soft magnetic material is produced parallel to, but spaced from the MR sensor in the central active region only, to produce a transverse bias in the central region, where the output is sensed, and maintain the MR sensor in a linear response mode.

The prior art does not show a continuous exchange bias film which covers the entire MR sensor in which the orientation of the resulting bias is set to give a non-uniform distribution of bias over the sensor configuration with the bias oriented at a chosen angle in the central and end regions.

SUMMARY OF THE INVENTION

It is therefore the principal object of this invention to provide a continuous exchange bias film which covers the entire MR sensor, in which the bias directions in different regions of the bias film are defined to produce optimum device performance. In accordance with the invention, a magnetic read transducer is provided in which a thin film of magnetoresistive conductive member is formed with end regions separated by a central region. A decoupling layer is formed which covers at least the active region of the magnetoresistive conductive layer, and a thin film of soft magnetic material is formed extending over the magnetoresistive conductive layer so that the film is in contact with the magnetoresistive conductive layer in the passive end regions and separated from the magnetoresistive conductive layer by the decoupling layer in the active region. A thin film of antiferromagnetic material is formed in direct contact with the thin film of soft magnetic material, to produce an exchange bias field. The antiferromagnetic material is initialized to produce an effective bias field that is directed substantially longitudinally within the passive regions and at some selected angle within the active sensor region whereby a longitudinal bias is produced in the passive regions and a substantially transverse bias is produced at the selected angle in the active region of the MR sensor.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
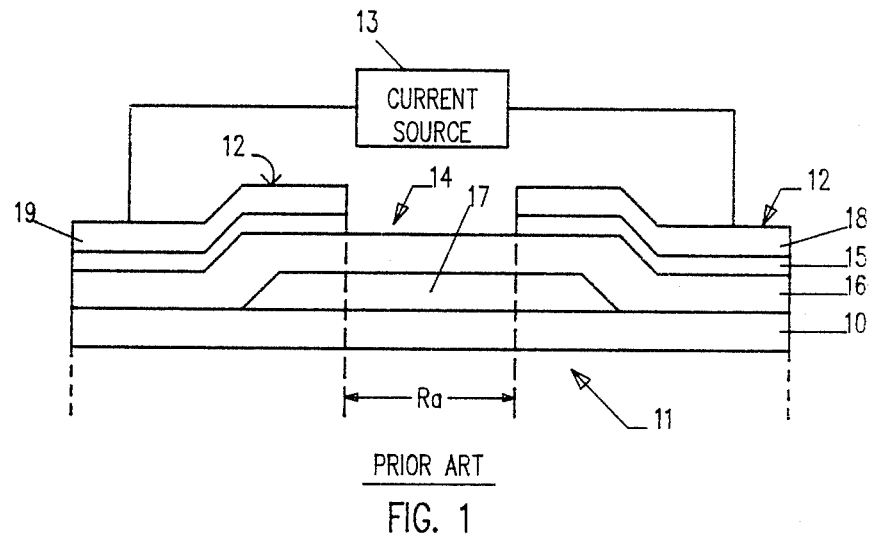
FIG. 1 is a view looking at the sensing edge of a specific embodiment of a prior art magnetoresistive read transducer assembly.

Prior to describing the present invention, a specific embodiment of the previously identified commonly assigned, Tsang invention will be described briefly in conjunction with FIG. 1. The magnetic read head 11 utilizes a magnetoresistive (MR) sensor 10, and the MR sensor can be divided into two regions, the central active region 14, where actual sensing of data is accomplished, and passive end regions 12. The invention recognizes that the two regions should be biased in different manners with longitudinal bias only in the end regions 12 and transverse bias in the active region 14. The transverse bias is produced by soft magnetic film layer 16 which is separated from the MR layer 10 in the central region 14 by a thin nonmagnetic spacer layer 17 so that a transverse bias can be produced only in the central region 14 of the MR sensor 10 to produce a linear response mode in MR sensor 10. The longitudinal bias is produced by an antiferromagnetic exchange bias layer 15 which is deposited to be in direct physical contact with the soft magnetic film layer 16 only in the end regions 12. Antiferromagnetic layer 15 creates an interfacial exchange interaction with the soft magnetic film layer 16 which results in an effective bias field experienced by the soft magnetic film layer 16 and also by the MR sensor 10 which is in contact with the soft magnetic film layer 16. The resulting bias field is oriented longitudinally to retain the end regions uniformly magnetized in a longitudinal direction. Conductor leads 18 and 19, over which the output signal is sensed, are deposited only in the end regions 12 over the antiferromagnetic layer 15.

A bias current source 13 is connected between conductor leads 18 and 19 to produce a bias current in the central region 14 of the MR sensor 10 to magnetically bias the MR sensor with transverse bias. The transverse bias is produced in that part of the central active region 14 of the MR sensor 10 in which the bias current and the thin spacer layer 17 are both present. The transverse bias produces magnetization at a chosen angle in the central region 14 of the MR sensor 10, so that the MR sensor 10 is maintained in a high sensitivity condition. In the embodiment shown in FIG. 1, the transverse bias is provided in a central active region Ra.

Figure 2:
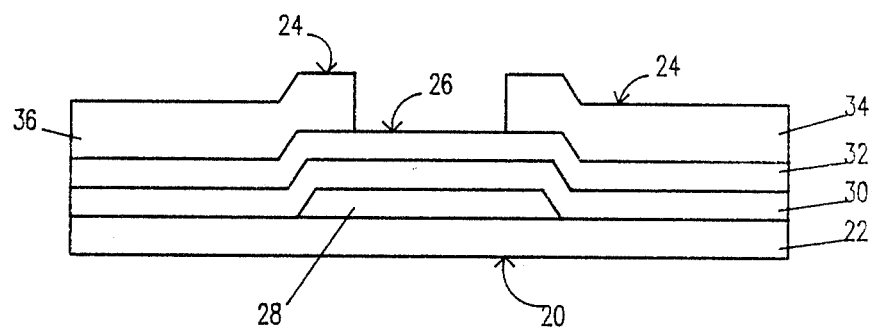
FIG. 2 is a view looking at the sensing edge of a specific embodiment of a magnetoresistive read transducer assembly according to the present invention.

With reference to FIG. 2, the magnetic read head assembly 20, according to the present invention, comprises a magnetoresistive (MR) sensor 22, spacer layer 28, a soft magnetic layer 30 and an antiferromagnetic layer 32 which is initialized such as to provide a substantially longitudinal bias over the passive regions 24 and a substantially transverse bias over the active region 26 of the soft magnetic film layer 30. As used in this application, the active region 26 is defined as the region which produces an MR output signal in response to magnetic excitation, and this region has both a bias/sense current and a spacer layer 28. The passive regions 24, produce no output in response to magnetic excitation, and these regions do not have both a bias/sense current and a spacer layer 28.

Figure 3:
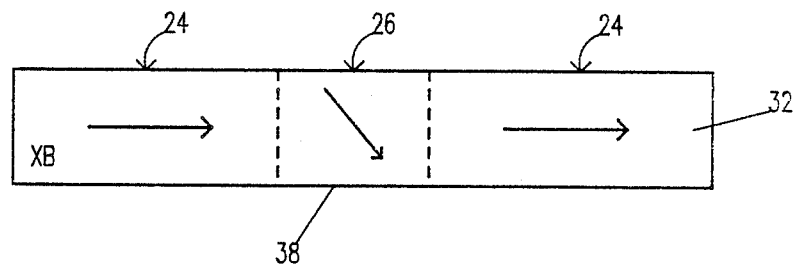
FIG. 3 is a top view with some parts cut away which shows the desired exchange bias configuration for the magnetic read transducer assembly of FIG. 2.

The MR sensor 22 is first deposited over both passive end regions 24 and central active region 26. Thin nonmagnetic spacer layer 28 is deposited to cover at least the active region 26 and soft magnetic film layer 30 is deposited over both the passive regions 24 and the active region 26. The soft magnetic film layer 30 is separated from MR sensor 22 in the active region 26 by thin spacer layer 28 so that a transverse bias can be produced only in the central region 26 of the MR sensor 22 to produce a linear response mode in MR sensor 22. The preferred material for the MR sensor 22 is NiFe, and the preferred material for the soft magnetic film layer 30 is NiFeRh. An antiferromagnetic layer 32 is deposited over the soft magnetic film layer 30 in both the central region 26 and the end regions 24. The preferred material for the antiferromagnetic layer 32 is MnFe. Antiferromagnetic layer 32 creates an interfacial exchange interaction with the soft magnetic film layer 30 that results in an effective bias field experienced by soft magnetic film layer 30 and also by the MR sensor 22 where it is in contact with the soft magnetic film layer 30. The resulting bias field is oriented longitudinally within the passive regions 24 to retain the end regions 24 uniformly magnetized in a longitudinal direction as is shown in FIG. 3. Conductor leads 34 and 36, over which the output signal is sensed, are deposited only in the passive regions 24 over the antiferromagnetic layer 32, and their edge defines the active/passive region boundary.

Improved MR sensor performance is achieved by the present invention by having exchange bias cover not only the passive regions of the MR sensor and the soft magnetic film layer but also the active region of the soft magnetic film layer. The different regions are biased along different directions, as shown in FIG. 3, as required for optimal device performance.

The exchange bias field in the passive regions 24 of antiferromagnetic layer 32 is substantially parallel to the sensing edge 38 of the magnetic head read assembly, and the exchange bias field in the active region 26 of antiferromagnetic layer 32 is at a selected angle to the sensing edge 38. These bias directions are defined after device fabrication, as will be described in greater detail below, by means of a thermal setting procedure which employs a suitable combination of bias current and applied magnetic field while the sensor is cooling through the Neel temperature. The use of this approach also improves exchange bias consistency due to in-situ deposition of the exchange bias interface comprising the biasing and biased films.

Figure 4:
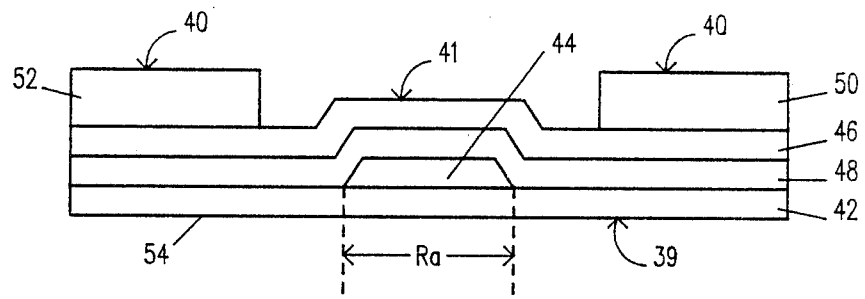
FIG. 4 is a view looking at the sensing edge of an alternate embodiment of a magnetoresistive read transducer assembly according to the present invention.

An alternate embodiment of the MR read transducer assembly, according to the present invention, is shown in FIG. 4. In this embodiment, the MR sensor 42 is deposited over both the passive regions 40 and the active region 41, but, in this embodiment, the extent of the thin nonmagnetic spacer layer 44 is less than the extent of the conductor leads 50 and 52. The soft magnetic film layer 48 and antiferromagnetic layer 46 are deposited over both the passive regions 40 and the active region 41. The active region Ra is again defined by the extent of the MR sensor 42 within the active region 41 in which a bias current and thin spacer layer 44 are present. In this embodiment, the MR read transducer assembly 39 has a sensing edge 54 which is closely spaced from the magnetic medium during normal operation.

Figure 5:
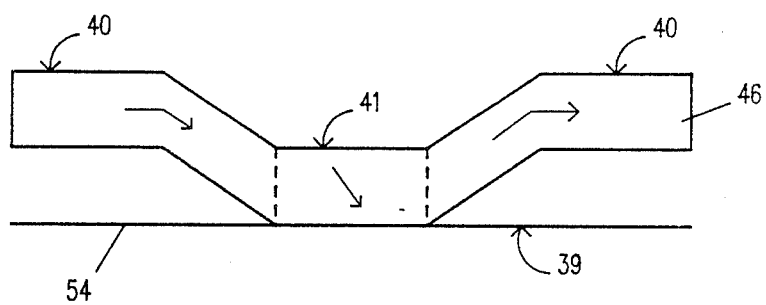
FIG. 5 is a top view with some parts cut away which shows the desired exchange bias configuration for the magnetic read transducer assembly of FIG. 4.

The MR sensor 42, the soft magnetic film layer 48 and the antiferromagnetic layer 46 are shaped as shown in FIG. 5 in which only the active region of the sensor extends to the sensing edge 54. The passive regions 40 of these components of the head are recessed from the sensing edge 54, and conductor leads 50 and 52 are in contact with the passive regions 40 away from the sensing edge 54. As shown in FIG. 5, the exchange bias field in the passive regions 40 of antiferromagnetic layer 46 is substantially parallel to the sensing edge 54 of the MR sensor, and the exchange bias field in the active region 41 of antiferromagnetic layer 46 is at a selected angle to the sensing edge 54. The preferred angle is in the range of about 60 degrees to about 85 degrees with respect to the sensing edge 54.

The embodiment of the invention shown in FIG. 4 has the advantage of less sensitivity to its operating environment since only the active region of the MR sensor 42 extends to the sensing edge 54. The fact that the conductor leads 50 and 52 do not extend to the sensing edge 54 eases mechanical problems, and the recessing of the MR sensor 42 in the passive regions 40 leads to reduced side reading.

The present invention has the principal advantage that it makes possible the in-situ deposition of the soft magnetic layer and the layer of antiferromagnetic material since these layers define the critical exchange bias interface. Since no fabrication steps are needed between the deposition of the soft magnetic layer and the deposition of the layer of antiferromagnetic material, it is much easier to maintain an uncontaminated exchange bias interface.

The present invention has the additional advantage that the regions of exchange bias need not be patterned physically, such as by means of a prior art photolithographic process, for example, but can instead be patterned to a desired orientation during a thermal setting procedure. The thermal setting procedure comprises the steps of raising the temperature of the magnetic read head assembly above the Neel temperature of the antiferromagnetic layer where this layer becomes nonmagnetic, and applying suitable values of initialization magnetic field and bias current. As the device cools to below the Neel temperature, the magnetization configuration of the soft magnetic film layer is copied into the antiferromagnetic layer. Now the biasing film, the antiferromagnetic layer, produces a pattern of exchange bias on active regions of the soft magnetic film layer and on the passive regions of both the soft magnetic film layer and the MR layer.

Figure 8:
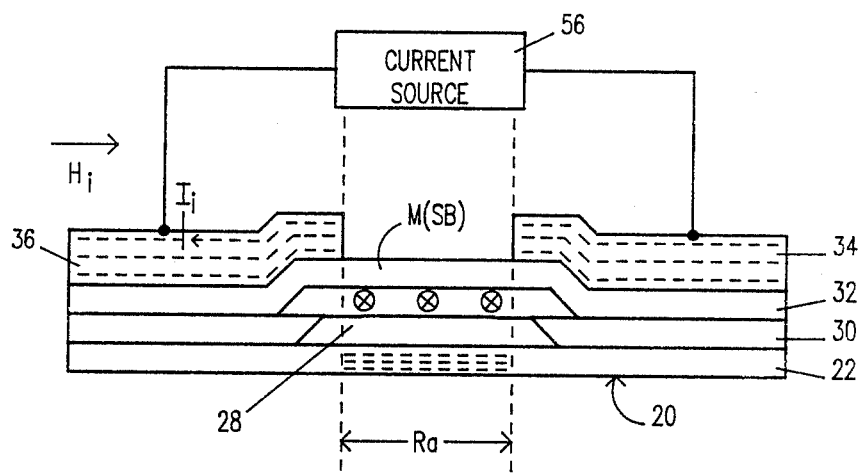
FIG. 8 is a sketch showing the thermal setting procedure for the means for producing an exchange bias for the magnetic read transducer assembly of FIG. 2.

The thermal setting procedure is shown for the FIG. 2 embodiment in FIG. 8. The procedure uses an externally applied longitudinal magnetic initialization field, $H_i$, and an initialization current $I_i$, supplied by current source 56 as shown in FIG. 8. The cross sections include the current flow pattern schematically through the conductor leads and the layers of metallurgy. In this embodiment the width of the active region is defined by the current flow pattern.

Figure 6:
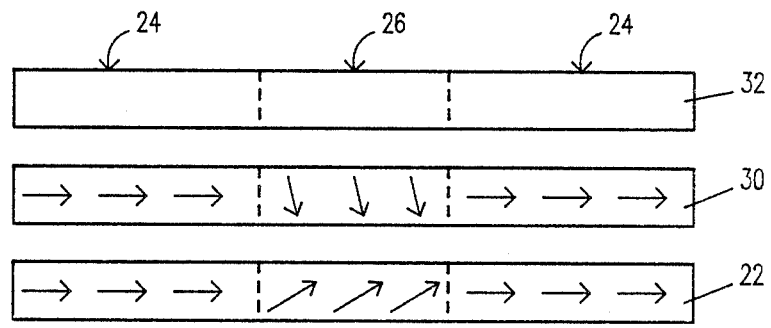
FIG. 6 is an exploded view which shows the magnetization configuration of the thin film of soft magnetic material and the MR layer of magnetic read transducer assembly of FIG. 2 when the temperature is greater than the Neel temperature of the means for producing an exchange bias.

The magnetization configuration is shown for temperatures above the Neel temperature in FIG. 6 in which a longitudinal bias is produced in the passive regions due to the applied magnetic field. A transverse bias is also generated in the active region. In most cases the current $I_i$ is chosen so that the soft magnetic film layer is saturated, and in this case the magnetization would be at ninety degrees to the sensing edge. However, the applied magnetic field adds sufficient field so that the magnetization in the central region is at a selected angle. The angle can be chosen by an appropriate choice of the applied magnetic field $H_i$ and the field generated by the current $I_i$.

Figure 7:
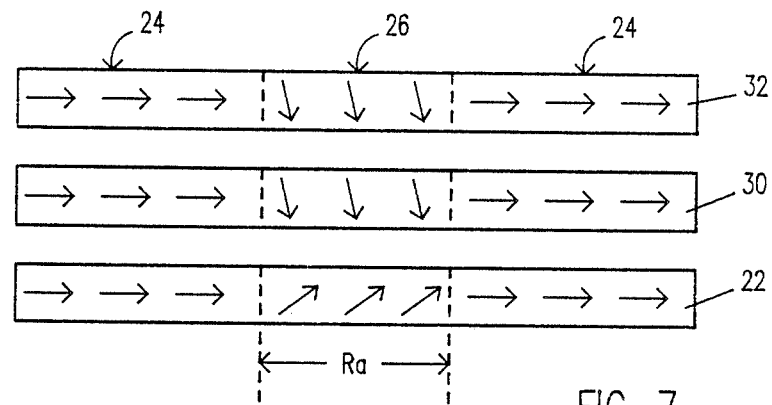
FIG. 7 is an exploded view which shows the magnetization configuration of the thin film of soft magnetic material, the MR layer and the means for producing an exchange bias of the magnetic read transducer assembly of FIG. 2 when the temperature is less than the Neel temperature of the means for producing an exchange bias.

As the device cools to below the Neel temperature, as shown in FIG. 7, the magnetization configuration in the soft magnetic film layer is copied into the antiferromagnetic layer. This configuration of magnetization then remains after the applied magnetic field $H_i$ and the current $I_i$ are removed. This completes the thermal setting of a patterned exchange bias orientation within the continuous antiferromagnetic layer.

Figure 9:
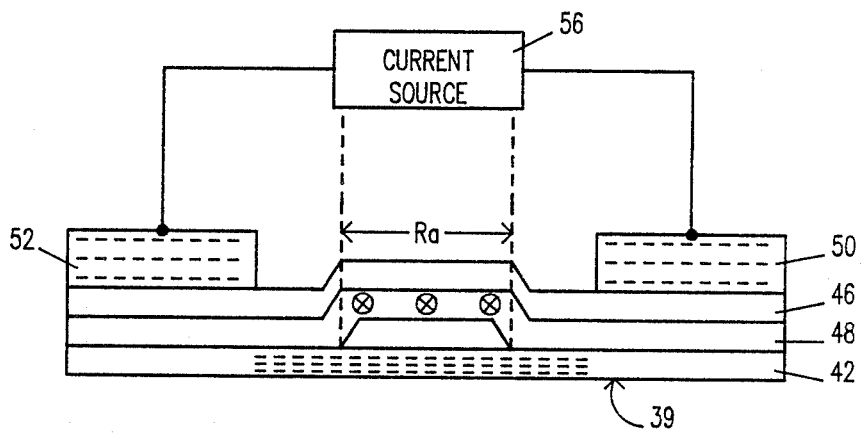
FIG. 9 is a sketch showing the thermal setting procedure for the means for producing an exchange bias for the magnetic read transducer assembly of FIG. 4.

The thermal setting procedure is carried out in the same way for the embodiment of the invention shown in FIG. 4. The procedure is illustrated in FIG. 9. In this case the width of the active region is determined by the width of the nonmagnetic spacer rather than the current flow path.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetic read transducer comprising:
   a thin film of magnetoresistive conductive layer formed of magnetic material, said magnetoresistive conductive layer having passive end regions separated by a central active region;
   a decoupling layer covering at least said active region of said magnetoresistive conductive layer;
   a thin film of soft magnetic material extending over said passive regions and said active region of said magnetoresistive conductive layer, said thin film of soft magnetic material being parallel to and in contact with said decoupling layer and separated from said magnetoresistive layer in said active region by said decoupling layer, said thin film of soft magnetic material being in contact with said magnetoresistive conductive member in the passive regions; and
   a thin film of antiferromagnetic material in direct contact with and continuously covering the entire thin film of soft magnetic material to produce an exchange bias field, said exchange bias field having the exchange bias oriented substantially longitudinally within the passive segments of said thin film of soft magnetic material and said magnetoresistive conductive member and at a selected angle within the active region of said thin film of soft magnetic material whereby a longitudinal bias is produced in said passive regions and a substantially transverse bias is produced at said selected angle in the active region of said magnetoresistive conductive member.

2. The magnetic read transducer of claim 1 wherein said thin film of magnetoresistive conductive layer is NiFe.

3. The magnetic read transducer of claim 1 wherein said thin film of soft magnetic material is NiFeRh.

4. The magnetic read transducer of claim 1 wherein said thin film of antiferromagnetic material is MnFe.

5. The magnetic read transducer of claim 1 wherein the part of said magnetoresistive conductive layer covered by said decoupling layer is substantially equal to said active region.

6. The magnetic read transducer of claim 1 wherein the part of said magnetoresistive conductive layer covered by said decoupling layer is greater than said active region.

7. The magnetic read transducer of claim 6 additionally comprising:
   spaced conductor means electrically connected to said magnetoresistive conductive layer with the part of said magnetoresistive conductive layer covered by said decoupling layer whereby said spaced conductor means define said active region.

8. The magnetic read transducer of claim 7 additionally comprising:
said magnetic read transducer having a sensing edge;
said thin film of magnetoresistive conductive layer being shaped so that only the active region of said magnetoresistive layer extends to said sensing edge.

9. The magnetic read transducer of claim 1 wherein said selected angle is from about 60 to about 85 degrees with respct to said sensing edge.

10. A magnetic read transducer comprising:
a thin film of magnetoresistive conductive layer formed of magnetic material, said magnetoresistive conductive layer having passive end regions separated by a central active region;
a decoupling layer covering at least said active region of said magnetoresistive conductive layer;
a thin film of soft magnetic material extending over said passive regions and said active region of said magnetoreistive conductive layer, said thin film of soft magnetic material being parallel to and in contact with said decoupling layer and separated from said magnetoresistive layer in said active region by said decoupling layer, said thin film of soft magnetic material being in contact with said magnetoresistive conductive member in the passive regions;
a thin film of antiferromagnetic material in direct contact with and continuously covering the entire thin film of soft magnetic material to produce an exchange bias field; and
means for orienting said exchange bias field in said passive regions so that said exchange bias field is directed substantially longitudinally along the thin film of soft magnetic material and the magnetoresistive conductive member, and means for orienting said exchange bias field in said active region of said thin film of soft magnetic material at a selected angle whereby a longitudinal bias is produced in said passive regions and a substantially transverse bias is produced at said selected angle in the active region of said transducer.

11. The magnetic read transducer of claim 10 wherein said thin film of magnetoresistive conductive layer is NiFe.

12. The magnetic read transducer of claim 10 wherein said thin film of soft magnetic material is NiFeRh.

13. The magnetic read transducer of claim 10 wherein said thin film of antiferromagnetic material is MnFe.

14. The magnetic read transducer of claim 10 wherein the part of said magnetoresistive conductive layer covered by said decoupling layer is substantially equal to said active region.

15. The magnetic read transducer of claim 10 wherein the part of said magnetoresistive conductive layer covered by said decoupling layer is greater than said active region.

16. The magnetic read transducer of claim 15 additionally comprising:
spaced conductor means electrically connected to said magnetoresistive conductive layer with the part of said magnetoresistive conductive layer covered by said decoupling layer whereby said spaced conductor means define said active region.

17. The magnetic read transducer of claim 16 additionally comprising:
said magnetic read transducer having a sensing edge;
said thin film of magnetoresistive conductive layer being shaped so that only the active region of said magnetoresistive layer extends to said sensing edge.

18. The magnetic read transducer of claim 10 wherein said selected angle is from about 60 to about 85 degrees with respect to said sensing edge.

* * * * *